United States Patent
Melero Cazorla et al.

(10) Patent No.: US 12,441,127 B2
(45) Date of Patent: Oct. 14, 2025

(54) ADJUSTING MEDIA POSITIONS BASED ON READ MEDIA ADVANCEMENTS AND PREDICTIONS

(71) Applicant: Hewlett-Packard Development Company, L.P., Spring, TX (US)

(72) Inventors: David Melero Cazorla, Sant Cugat del Valles (ES); Jorge Porras Martinez, Sant Cugat del Valles (ES); Martin Urrutia Nebreda, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 184 days.

(21) Appl. No.: 18/258,632

(22) PCT Filed: Jan. 22, 2021

(86) PCT No.: PCT/US2021/014702
§ 371 (c)(1),
(2) Date: Jun. 21, 2023

(87) PCT Pub. No.: WO2022/159104
PCT Pub. Date: Jul. 28, 2022

(65) Prior Publication Data
US 2024/0034078 A1 Feb. 1, 2024

(51) Int. Cl.
*B41J 13/00* (2006.01)
*B41J 11/00* (2006.01)
(Continued)

(52) U.S. Cl.
CPC ....... *B41J 13/0009* (2013.01); *B41J 11/0095* (2013.01); *B41J 13/03* (2013.01);
(Continued)

(58) Field of Classification Search
CPC .... B41J 13/0009; B41J 11/0095; B41J 13/03; B65H 5/062; B65H 7/06; B65H 2511/417;
(Continued)

(56) References Cited

U.S. PATENT DOCUMENTS 7,699,305 B2 4/2010 Totsuka et al.
7,991,306 B2 8/2011 Shibaki
(Continued)

FOREIGN PATENT DOCUMENTS

JP 2016-061742 A 4/2016

*Primary Examiner* — Henok D Legesse
(74) *Attorney, Agent, or Firm* — Jordan IP Law, LLC

(57) ABSTRACT

A printing apparatus is disclosed herein. The apparatus comprises a platen to hold a media thereon, the media moveable along a media path direction; a displacement mechanism to move the media over the platen and along the media path direction; a media advancement sensor; and a controller. The controller to determine a media advancement prediction based on an operational parameter of the displacement mechanism; determine a read media advancement corresponding to the media advancement prediction; determine a sensor reading failure based on the media advancement prediction and the read media advancement; determine that the media advanced a distance corresponding to the media advancement prediction if the sensor reading failure is detected; determine that the media advanced a distance corresponding to the read media advancement if the sensor reading failure is not detected; and to adjust the position of the media by controlling the displacement mechanism to move the media based on the determined media advanced distance.

15 Claims, 4 Drawing Sheets

(51) Int. Cl.
*B41J 13/03* (2006.01)
*B65H 5/06* (2006.01)
*B65H 7/06* (2006.01)

(52) U.S. Cl.
CPC ............... *B65H 5/062* (2013.01); *B65H 7/06* (2013.01); *B65H 2511/417* (2013.01); *B65H 2513/11* (2013.01); *B65H 2553/51* (2013.01); *B65H 2801/06* (2013.01)

(58) Field of Classification Search
CPC ............ B65H 2513/11; B65H 2553/51; B65H 2801/06; B65H 2511/13; B65H 2511/20; B65H 2511/212; B65H 2511/416; B65H 5/06; B65H 7/08
See application file for complete search history.

(56) References Cited

U.S. PATENT DOCUMENTS

| | | | |
|---|---|---|---|
| 9,533,850 | B2 | 1/2017 | Yoshikawa et al. |
| 9,744,759 | B2 | 8/2017 | Inoue |
| 2007/0246879 | A1 | 10/2007 | Sagawa et al. |
| 2010/0098471 | A1 | 4/2010 | Satoh et al. |
| 2018/0039217 | A1 | 2/2018 | Osada et al. |
| 2020/0324991 | A1* | 10/2020 | Nakamura ............. G03G 15/70 |

* cited by examiner

ADJUSTING MEDIA POSITIONS BASED ON READ MEDIA ADVANCEMENTS AND PREDICTIONS

BACKGROUND

Printers are devices that record images on a printing media. Printers comprise printheads in a carriage that selectively propel an amount of printing fluid on the media. Some printers may include internal printing fluid reservoirs. Other printers may use external printing fluid cartridges as printing fluid reservoirs.

BRIEF DESCRIPTION OF THE DRAWINGS

The present application may be more fully appreciated in connection with the following detailed description of non-limiting examples taken in conjunction with the accompanying drawings, in which like reference characters refer to like parts throughout and in which.

DETAILED DESCRIPTION

Figure 1A:
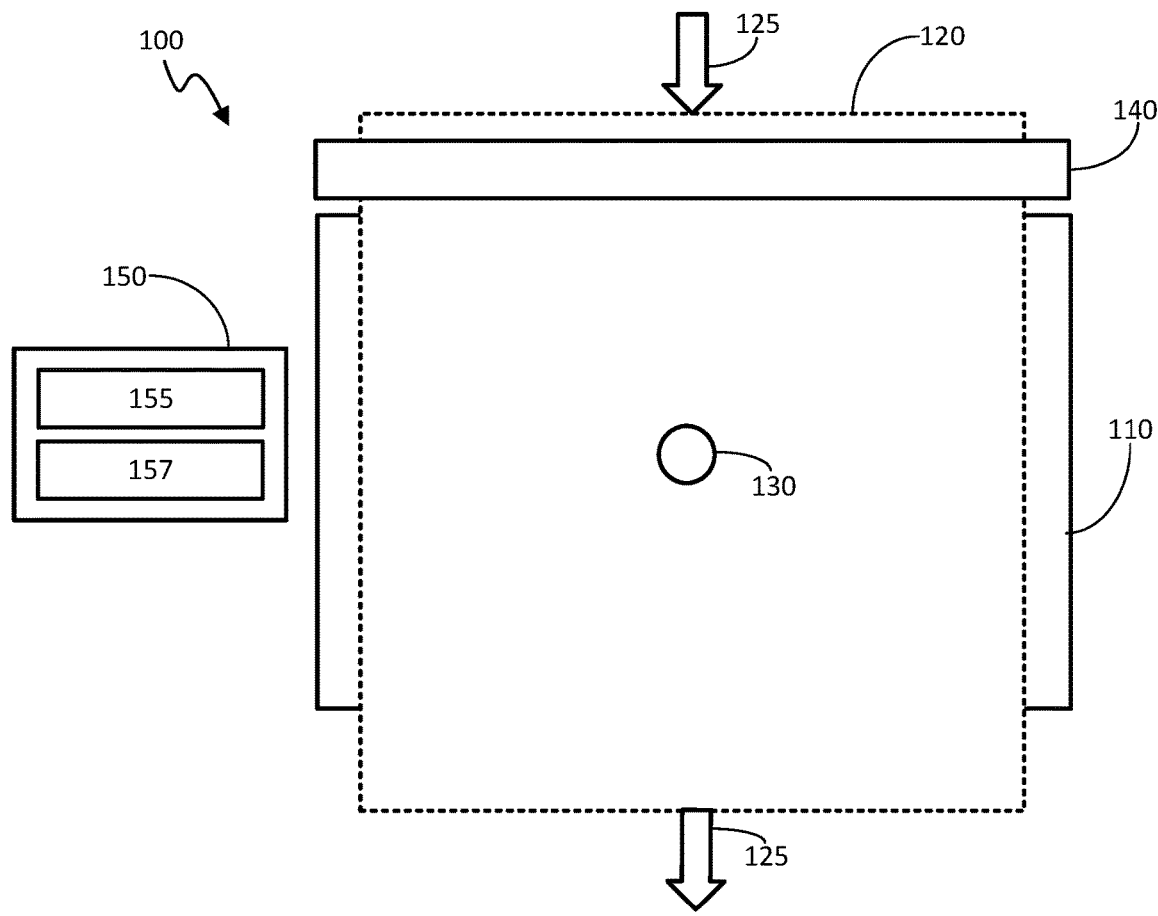
FIG. 1A is a schematic diagram showing an example of a top view of a printing apparatus with a media thereon.

The following description is directed to various examples of printing systems. Throughout the present disclosure, the terms "a" and "an" are intended to denote at least one of a particular element. In addition, as used herein, the term "includes" means includes but not limited to, the term "including" means including but not limited to. The term "based on" means based at least in part on.

As used herein, the terms "about" and "substantially" are used to provide flexibility to a range endpoint by providing that a given value may be, for example, an additional 15% more or an additional 15% less than the endpoints of the range. In another example, the range endpoint may be an additional 30% more or an additional 30% less than the endpoints of the range. The degree of flexibility of this term can be dictated by the particular variable and would be within the knowledge of those skilled in the art to determine based on experience and the associated description herein.

For simplicity, it is to be understood that in the present disclosure, elements with the same reference numerals in different figures may be structurally the same and may perform the same functionality.

Printing apparatuses, such as printers, comprise a carriage having elements to selectively propel an amount of printing fluid on a media. In some printers, the carriage is a fixed carriage spanning at least the full width of the printable area of the media, such that as the media travels underneath, some elements from the carriage propel the printing fluid and thereby generate the image to be recorded on the media. In other examples, however, the carriage is a scanning carriage which does not span the full width of the printable area of the media. The scanning carriage is therefore controllable to scan across the full width of the printable area of the media (i.e., scanning direction) and to selectively propel the printing fluid on the media. These apparatuses are commonly referred to as scanning printers.

Some printing apparatuses comprise an input roller to host a media roll to be supplied to the printing area. Additionally, some examples further comprise an output roller in which the printed media is rolled. Both input and output rollers may generate a tension to the media such that the media is stretched on the printing area. Other printing apparatuses do not comprise an input roller or/nor the output roller.

Printers additionally comprise a printing platform or platen located under the printing carriage such that the media travels between the platen and the carriage during a printing operation. In some examples, the media may travel at a constant speed (e.g., continuous printing). In other examples, such as in scanning printers, the media may travel in discretional advance segments.

In some of the above examples, the media may not advance in such continuous speed or in the intended discretional advance segments. This may cause part quality issues as the printing elements within the printing carriage are accurately controlled to eject printing fluid in specific precise locations. Therefore, accurately controlling the advance of the media leads to printed product with a superior print quality.

Some printers may accommodate a plurality of printing media of different thicknesses, stretchability and rigidity values. Some printing media may include paper, textile, vinyl, wood, methacrylate, other plastics, ceramic, foam, metal or composites. Variability in media therefore has an influence on the degree of deformation of such media and how the media travels though the platen.

In the examples herein, the terms "width" and "length" have been used. The two terms are intended to denote two substantially orthogonal directions within a horizontal plane. In further examples, the terms width and length may be used interchangeably. Furthermore, the terms "laterally" and "vertically" have been used. These terms are intended to further denote two substantially orthogonal directions, where laterally is a direction within the horizontal plane and vertically is the orthogonal direction from the horizontal plane (e.g., normal vector). In some examples herein, the "vertical" direction is further referred to media path direction, and the "horizontal" directions is further referred to as scanning direction.

Figure 1B:
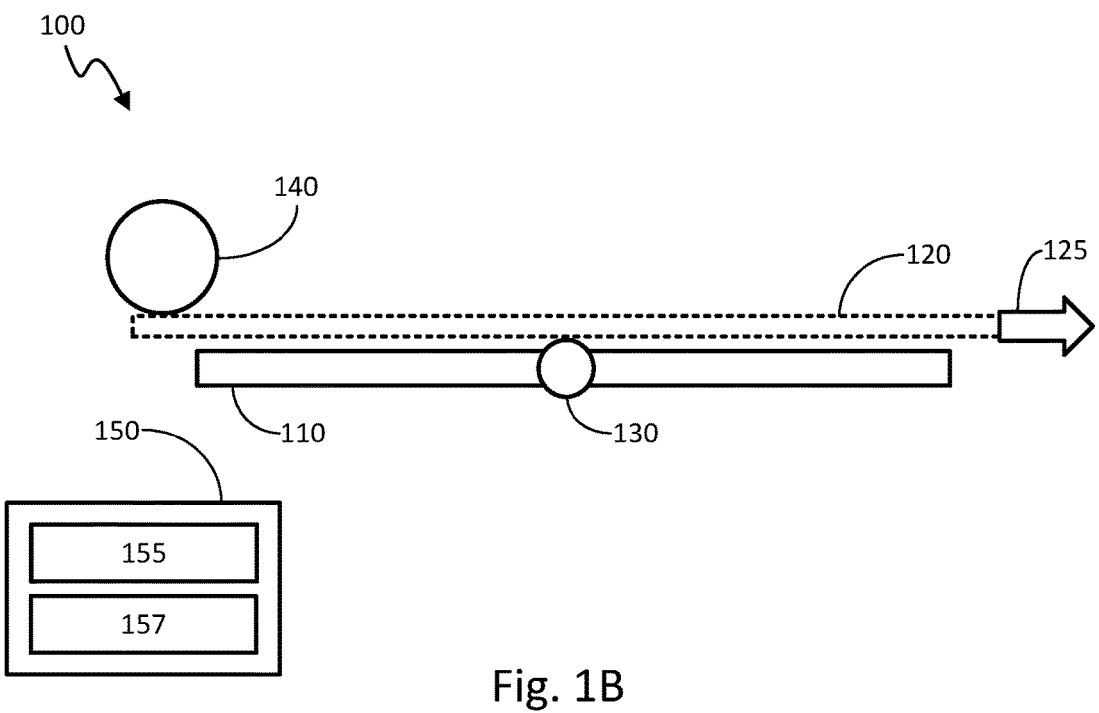
FIG. 1B is a schematic diagram showing an example of a side view of a printing apparatus with a media thereon.

Referring now to the drawings, FIG. 1A-1B are schematic diagrams showing examples of a front and side views of a printing apparatus 100 respectively, such as a printer.

The printing apparatus 100 comprises a platen 110 defining a printing zone. The printing zone is the printable area on the platen 110 which is reachable by a carriage to record an image to a media located thereon. The platen 110 is to hold a media 120 thereon. The media 120 is to move along the length of the platen 110, for example, in a media path direction 125. In the examples herein, the media 120 has been illustrated in dotted lines for clarity purposes, as it is an external element from the apparatus 100 that interacts with the apparatus 100 (e.g., the media may not be present during transportation of the apparatus 100). In some examples, such as the example depicted in FIG. 1A, the width of the media 120 covers substantially the full printable area on the platen 110. In other examples (not shown) however, the width of the media 120 covers a portion of the printable area on the platen 110. In yet other examples, the platen 110 is to hold a plurality of medias 120, the width of the combined plurality of medias 120 covering, at most, substantially the entire printable area on the platen 110.

In some examples, the platen 110 may be a porous platen fluidically connectable to a vacuum source (not shown) such that, when in use, the vacuum source is controlled to cause vacuum conditions to the at least the print area of the platen 110. In some examples, the porous platen may be implemented as a solid platen 110 made out of a porous material with air pockets to enable air to traverse therethrough. In other examples, however, the platen 110 may include a set of perforations or pores of a predefined size or set of predefined sizes distributed across the surface of the platen 110 in fluid communication with the vacuum source The pores or perforations are to enable a fluid, such as air, to traverse therethrough. The vacuum conditions provide a suction force to the media 120 such that substantially the entire lower surface of the media 120 sticks to the upper surface of the platform 110, thereby substantially inhibiting a vertical movement of the media 110 while enabling a movement of the media along the media path direction.

In some examples, the apparatuses 100A-B comprise a carriage (not shown) including a set of printheads in fluid communication with a set of printing fluids from a supply or cartridge. Some examples of printheads may include thermal inkjet printheads, piezoelectrical printheads, or any other suitable type of printhead. In some examples, the printheads are removable printheads. In other examples, the printheads are an integral part of the carriage. The supply is an external element from the apparatus 100. In some examples, the supply is to be hosted in the carriage, for example in a designated slot within the carriage. In other examples, the supply is to be hosted away from the carriage with fluid pathways that fluidically connect the supply with carriage and/or the printheads within the carriage.

In some examples, the carriage may be controllable to move laterally along a scanning direction (i.e., substantially orthogonal to the media path direction 125) and over the platen 110. In other examples, however, the carriage may not be moveable. When in use, the carriage is further controllable such that the printheads selectively eject amount of a set of printing fluids on the media 120 based on previously received print job data. The print job data may be a digital product including the images and/or text to be recorded on the media. The print job data may be received in a plurality of digital formats, such as JPEG, TIFF, PNG, PDF and the like.

In some examples, the printheads may eject a plurality of printing fluids. A printing fluid may be a solution of pigments dispersed in a liquid carrier such as water or oil. Some recording printing fluids may include Black ink, White ink, Cyan ink, Yellow ink, Magenta ink, Red ink, Green ink, and/or Blue ink. Other non-recording printing fluids may be used to provide additional properties to the printing fluids ejected on the media 120, for example, resistance to light, heat, scratches, and the like.

The apparatus 100 further comprises a displacement mechanism 140. The displacement mechanism 140 may be any mechanism capable of moving the media 120 on the platen 110 along the media path direction 125. The displacement mechanism 140 may be controlled to move the media 120 at an intended speed. In an example, the displacement mechanism 140 is an advancement roller. In some examples, the displacement mechanism 140 may span substantially the full width of the platen 110. In other examples, the displacement mechanism 140 comprises a plurality of elements located throughout the width of the platen 110 such that the combined movement of the elements is to controllably move the media 120 along the media path direction 125.

The apparatus 110 further includes a media advancement sensor 130. In an example, the media advancement sensor 130 is located along the media path direction 125 downstream the displacement mechanism 140. The media advancement sensor 130 is controllable to measure the real advance of the media 120 at the locations in which the media advancement sensor 130 is located thereto. The media advancement sensor 130 may be any sensor suitable for measuring the advance of the media 120, for example by measuring movement, displacement, position, velocity and/or acceleration. Examples of the media advancement sensor 130 may include an optical sensor (e.g., Optical Media Advance Sensor (OMAS), PIXART sensor, camera) or a mechanical sensor (e.g., rotary encoder). The media advancement sensor 130 may be located above or below the moveable media 120. In some examples of mechanical sensors, the sensor may further comprise a rotatory encoder or a shaft encoder to read the real advance of the media 120.

In additional examples, the apparatus 110 may comprise a plurality of media advancement sensors 130 to measure the media 120 advance at a plurality of respective locations along the media path direction 125. In some examples, a first location may be located at a media input location at the vicinity of the displacement mechanism 140 and a second location may be located at a media output location at substantially the opposite end of the platen 110 with respect to the displacement mechanism 140.

The displacement mechanism 140, the media advancement sensor 130, the movement of the carriage, the printheads, and the movement of the media may be controlled by a set of electronic components, such as a processor, a CPU, a SoC, a FPGA, a PCB and/or a controller. In the examples herein, a controller 150 may be understood as any combination of hardware and programming that may be implemented in a number of different ways. For example, the programming of modules may be processor-executable instructions stored in at least one non-transitory machine-readable storage medium 155 and the hardware for modules may include at least one processor 157 to execute those instructions. In some examples described herein, multiple modules may be collectively implemented by a combination of hardware and programming. In other examples, the functionalities of the controller may be, at least partially, implemented in the form of an electronic circuitry. A controller may be further understood as a distributed controller, a plurality of controllers, and the like.

Figure 2:
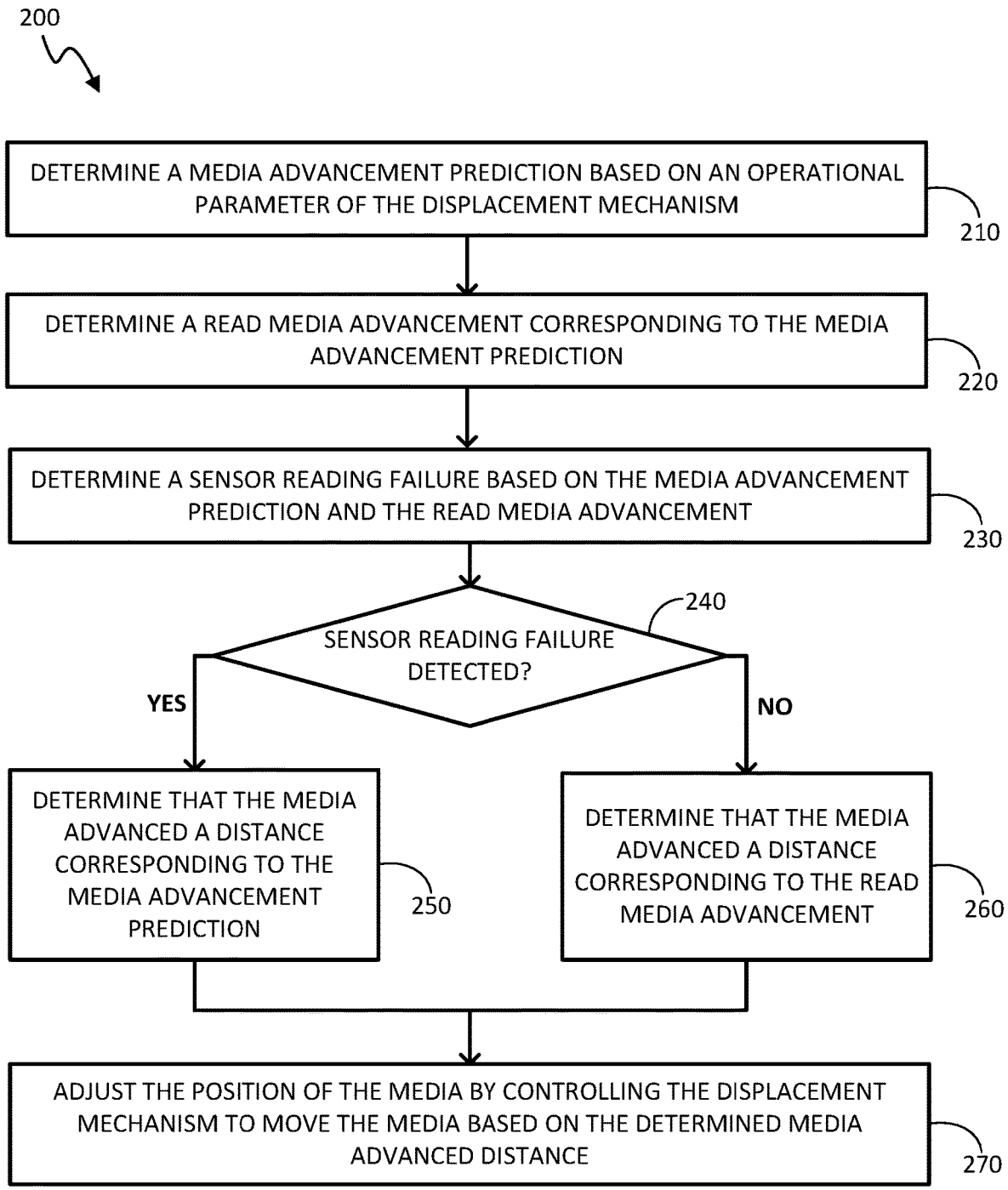
FIG. 2 is a flowchart of an example method for adjusting a position of a media in a printer.

FIG. 2 is a flowchart of an example method 200 for adjusting a position of a media in a printer. The method 200 may involve previously disclosed elements from FIGS. 1A-B referred to with the same reference numerals. In some examples, parts of the method 200 may be executed by a controller, such as controller 150 from FIGS. 1A-B.

At block 210, the controller 150 may determine a media advancement prediction based on an operational parameter of the displacement mechanism 140. In the examples herein, a media advancement prediction corresponds to data indicative of a forecasted distance advanced by the media in a predetermined period of time. In some examples, the operational parameter may be the angular speed and/or the angular displacement (e.g., displacement mechanism 140 is implemented as a roller). In other examples, the operational parameter may be a rotational speed, position, applied voltage, or any other parameter indicative of the operation of the displacement mechanism 140.

In additional examples, the controller 150 determines the media advancement prediction based on the displacement mechanism 140 operational parameter and some other parameters. Some examples of these parameters may include the type of media 120, the thickness of the media 120, the width of the media 120, the media input roller radius, the media output roller radius, the voltage of the displacement mechanism 140, and/or the platen 110 vacuum level. Some of these parameters may be controlled by a controller other than the controller 150.

At block 220, the controller 150 may determine, through the media advancement sensor 130, a reading of the media 120 advancement corresponding to the media advancement prediction (i.e., determined at block 210). In some examples, the reading of the media 120 may correspond to the media advancement prediction as the reading is taken during the same timeframe as the prediction. In other examples, however, the reading of the media 120 may correspond to the portion of the media 120 used to determine the media advancement prediction.

Figure 3A:
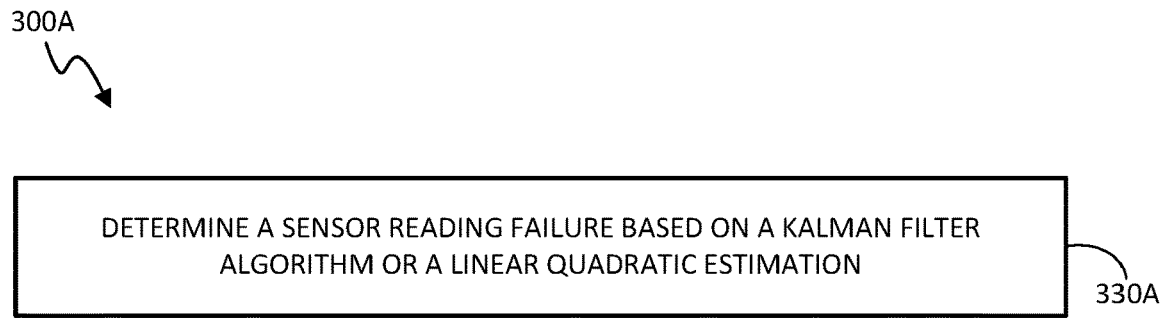
FIG. 3A is a flowchart of an example method for determining a sensor reading failure.
Figure 3B:
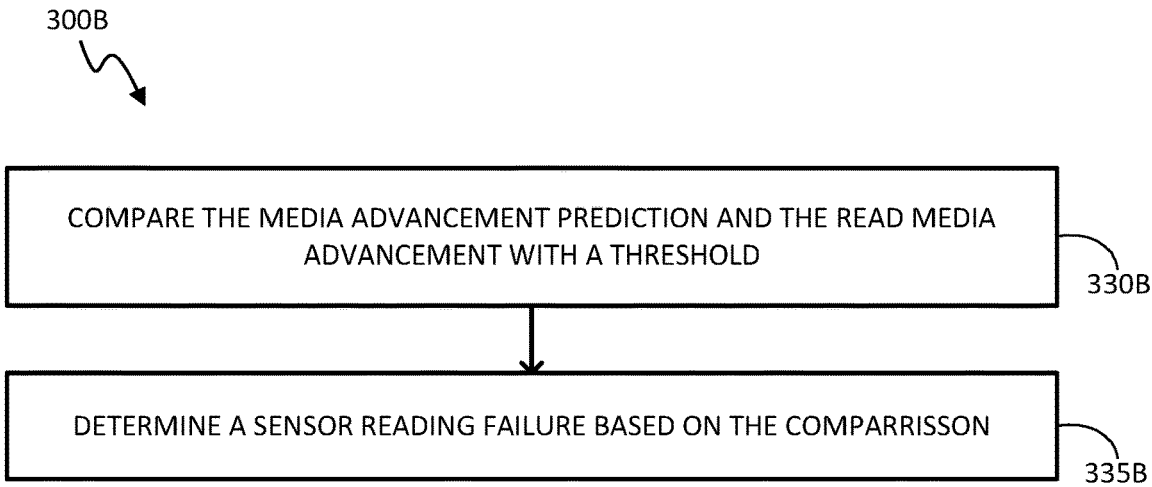
FIG. 3B is a flowchart of another example method for determining a sensor reading failure.

At block 230, the controller 150 may determine a sensor 130 reading failure based on the media 120 advancement prediction (i.e., block 210) and the read media 130 advancement (i.e., block 220). The controller 150 may determine the sensor 130 reading failure in a number of different ways. FIGS. 3A and 3B are examples of such sensor 130 reading failure determination.

At decision block 240, the controller 150 detects whether a sensor 130 reading failure occurred based on the determination of block 230. If a sensor reading failure is detected (i.e., "YES" branch), the controller 150 executes block 250. If a sensor reading failure is not detected (i.e., "NO" branch), the controller 150 executes block 260.

At block 250, the sensor 150 determines that the media 120 advanced a distance corresponding to the media advancement prediction (i.e., block 210), since a sensor 130 reading failure is detected and consequently the sensor 130 reading is not reliable anymore. After block 250, the controller 150 is to execute block 270.

At block 260, the sensor 150 determines that the media 120 advanced a distance corresponding to the read media advancement (i.e., block 220), since no sensor 130 reading failure occurred and the sensor 130 is more reliable than the media advancement prediction as it measured the real displacement of the media 120. After block 260, the controller 150 is to execute block 270.

At block 270, the controller is to adjust the position of the media 120 by controlling the displacement mechanism 140 to move the media 120 based on the determined media advanced distance (i.e., block 250 or 260). In some examples, the controller 150 is to adjust the position of the media 120 by controlling the media input roller and/or the media output roller angular speeds based on the determined media 120 advanced distance. In some other examples, the controller 150 is to adjust the position of the media 120 by controlling the media input roller and/or the media output roller angular positions based on the determined media 120 advanced distance.

FIGS. 3A and 3B are flowcharts of respective example methods (300A, 300B) for determining a sensor 130 reading failure. The methods (300A, 300B) may involve previously disclosed elements from FIGS. 1A-B referred to with the same reference numerals. In some examples, parts of the methods (300A, 300B) may be executed by a controller, such as controller 150 from FIGS. 1A-B. Methods 300A and 300B may be implemented as block 230 from FIG. 2.

Method 300A from FIG. 3A comprises block 330A in which the controller 150 is to determine the sensor 130 reading failure based on a Kalman filter algorithm or a linear quadratic estimation.

In the field of statistics and control theory, a Kalman filter or linear quadratic estimation is an algorithm that uses a series of measurements observed over time, containing statistical noise and other inaccuracies, and produces estimates of unknown variables that tend to be more accurate than those based on a single measurement alone, by estimating a joint probability distribution over the variables for each timeframe. The Kalman filter keeps track of the estimated state (i.e., media advancement prediction of block 210 of FIG. 2) and the variance of uncertainty of the estimate. The estimate is updated using a state transition model and measurements (i.e., read media advancement of block 220 of FIG. 2).

Method 300B of FIG. 3B comprises block 330B in which the controller 150 is to compare a relationship of the media advancement prediction and the read media advancement; with a threshold. In some examples, the relationship is a mathematical operation or a ratio. In some examples, the relationship may be calculated as the error between the media advancement prediction and the read media advancement. The threshold may be predetermined and encoded in the controller 150 or determined by the controller 150 using historical data and/or Machine Learning capabilities. In some examples, the threshold may be based on the selected print mode. In additional examples, the threshold may be stored in a Look Up Table (LUT) stored either in the memory 155 of the controller 150 or in an external wireless data repository such as the cloud which is to be accessed by the processor 170 of the controller 150.

Method 300B further comprises block 335B in which the controller 150 is to determine a sensor 130 reading failure based on the comparison. In some examples, block 335B may substitute block 230 of method 200.

Figure 4:
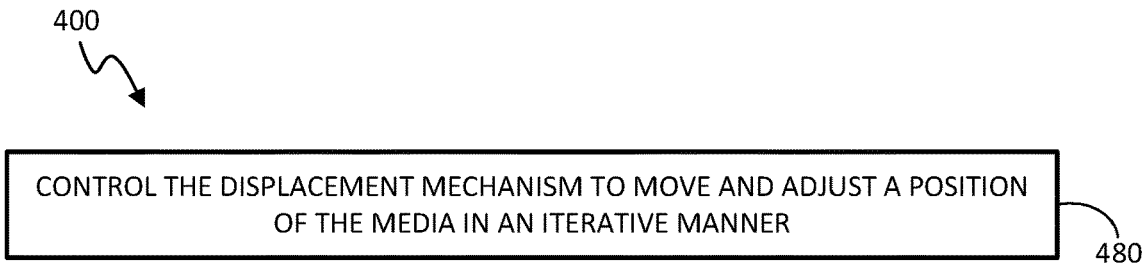
FIG. 4 is a flowchart of another example method for adjusting a position of a media in a printer.

FIG. 4 is a flowchart of another example method 400 for adjusting a position of the media 120 in a printer (e.g., printing apparatus 100). The method 400 may involve previously disclosed elements from FIGS. 1A-B referred to with the same reference numerals. In some examples, parts of the method 400 may be executed by a controller, such as controller 150 from FIGS. 1A-B. Method 400 may be implemented as block 270 from FIG. 2.

Method 400 comprises block 480 in which the controller 150 is to control the displacement mechanism 140 to move and adjust a position of the media 120 in an iterative manner. In the examples herein, each iteration may encompass from the media advancement prediction determination (i.e., block 210 of FIG. 2) to the displacement mechanism 140 control to move and adjust the position of the media 120.

In some examples, each iteration may be completed in less than about 100 ms. In other examples, each iteration may be completed in less than about 10 ms, such as about 2.4 ms.

Figure 5:
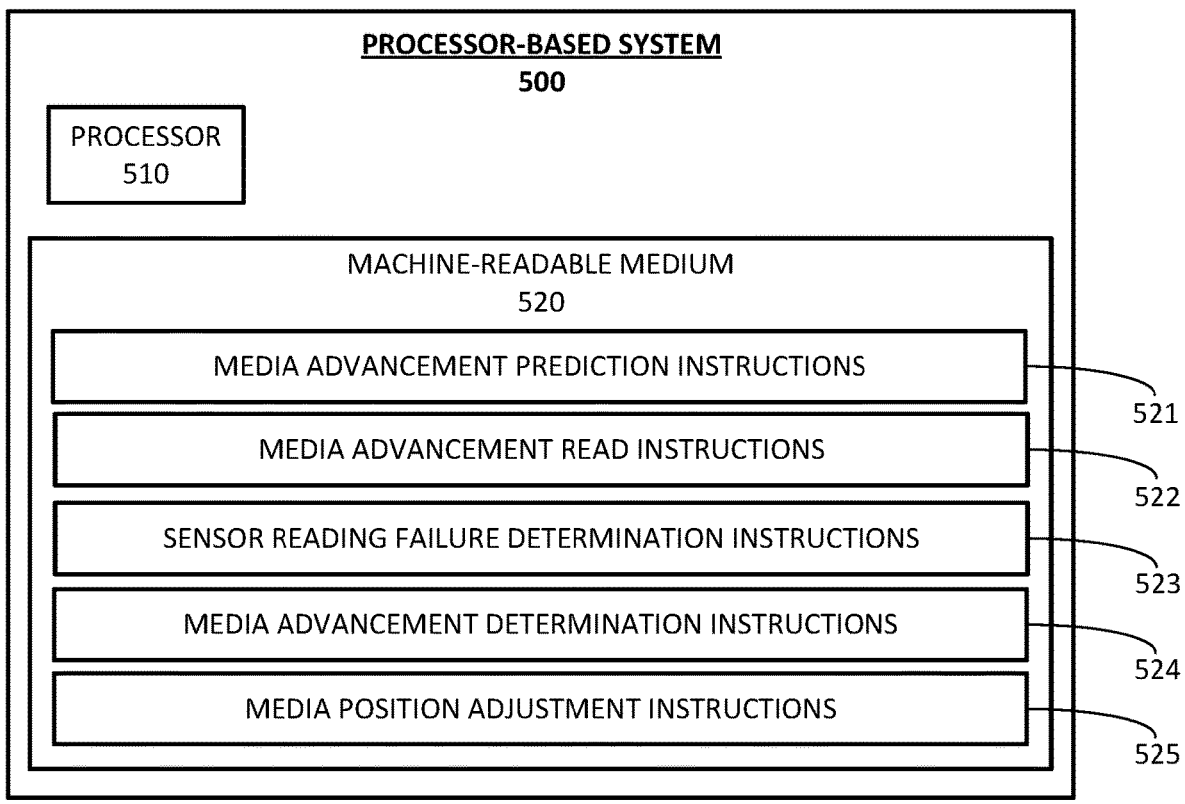
FIG. 5 is a block diagram showing a processor-based system example to adjust a position of a media in a printer.

FIG. 5 is a block diagram showing a processor-based system 500 example to adjust a position of a media in a printer. In the examples herein, the instructions of system 500 may involve previously disclosed elements from FIGS. 1A-1B, 2-4 referred to with the same reference numerals.

In some implementations, the system 500 is a processor-based system and may include a processor 510 coupled to a machine-readable medium 520. The processor 510 may include a single-core processor, a multi-core processor, an application-specific integrated circuit (ASIC), a field programmable gate array (FPGA), and/or any other hardware device suitable for retrieval and/or execution of instructions from the machine-readable medium 520 (e.g., instructions 522-526) to perform functions related to various examples. Additionally, or alternatively, the processor 510 may include electronic circuitry for performing the functionality described herein, including the functionality of instructions 521-525. With respect of the executable instructions represented as boxes in FIG. 5, it should be understood that part or all of the executable instructions and/or electronic circuits included within one box may, in alternative implementations, be included in a different box shown in the figures or in a different box not shown.

The machine-readable medium 520 may be any medium suitable for storing executable instructions, such as a random-access memory (RAM), electrically erasable programmable read-only memory (EEPROM), flash memory, hard disk drives, optical disks, and the like. In some example implementations, the machine-readable medium 520 may be a tangible, non-transitory medium, where the term "non-transitory" does not encompass transitory propagating signals. The machine-readable medium 520 may be disposed within the processor-based system 500, as shown in FIG. 5, in which case the executable instructions may be deemed "installed" on the system 500. Alternatively, the machine-readable medium 520 may be a portable (e.g., external) storage medium, for example, that allows system 500 to remotely execute the instructions or download the instructions from the storage medium. In this case, the executable instructions may be part of an "installation package". As described further herein below, the machine-readable medium may be encoded with a set of executable instructions 521-525.

Instructions 521, when executed by the processor 510, may cause the processor 510 to determine a media 120 advancement prediction based on an angular speed of a roller 140, wherein the roller is to displace the media 120 onto a platen 110.

Instructions 522, when executed by the processor 510, may cause the processor 510 to read, by a mechanical or optical sensor 130, a media advancement corresponding to the media advancement prediction.

Instructions 523, when executed by the processor 510, may cause the processor 510 to determine a sensor reading failure based on the media advancement prediction and the read media advancement.

Instructions 524, when executed by the processor 510, may cause the processor 510 to determine that the media 120 advanced a distance corresponding to the media advancement prediction if the sensor reading failure is detected; or determine that the media advanced a distance corresponding to the read media advancement if the sensor reading failure is not detected.

Instructions 525, when executed by the processor 510, may cause the processor 510 to adjust the position of the media 120 based on the determined media advanced distance.

The above examples may be implemented by hardware, or software in combination with hardware. For example, the various methods, processes and functional modules described herein may be implemented by a physical processor (the term processor is to be implemented broadly to include CPU, SoC, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processor, or a combination thereof.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

There have been described example implementations with the following sets of features:

Feature set 1: A printing apparatus comprising:
a platen to hold a media thereon, the media moveable along a media path direction;
a displacement mechanism to move the media over the platen and along the media path direction;
a media advancement sensor;
a controller to:
determine a media advancement prediction based on an operational parameter of the displacement mechanism;
determine a read media advancement corresponding to the media advancement prediction;
determine a sensor reading failure based on the media advancement prediction and the read media advancement;
determine that the media advanced a distance corresponding to the media advancement prediction if the sensor reading failure is detected;
determine that the media advanced a distance corresponding to the read media advancement if the sensor reading failure is not detected;
adjust the position of the media by controlling the displacement mechanism to move the media based on the determined media advanced distance.

Feature set 2: A printing apparatus with feature set 1, wherein the displacement mechanism is a roller and the operational parameter is an angular speed of the roller.

Feature set 3: A printing apparatus with any preceding feature set 1 to 2, wherein the controller is to determine the media advance prediction based on the displacement mechanism operational parameter and at least one of the media type, media thickness, the media width, a media input roller radius, a media output roller radius, the voltage of the displacement mechanism, and a platen vacuum level.

Feature set 4: A printing apparatus with any preceding feature set 1 to 3, wherein the sensor comprises a mechanical or an optical sensor.

Feature set 5: A printing apparatus with any preceding feature set 1 to 4, wherein the sensor comprises a rotatory encoder or a shaft encoder.

Feature set 6: A printing apparatus with any preceding feature set 1 to 5, wherein the controller is to control the displacement mechanism to move and adjust a position of the media in an iterative manner, each iteration being completed in less than 10 ms.

Feature set 7: A printing apparatus with any preceding feature set 1 to 6, wherein the controller is to determine a sensor reading failure based on a Kalman filter algorithm or a linear quadratic estimation.

Feature set 8: A printing apparatus with any preceding feature set 1 to 7, wherein the controller is to: compare the media advancement prediction and the read media advancement with a threshold; and determine a sensor reading failure based on the comparison.

Feature set 9: A printing apparatus with any preceding feature set 1 to 8, wherein the controller is further to adjust a position of the media by controlling a media input roller and/or a media output roller angular speeds based on the determined media advanced distance.

Feature set 10: A method to adjust a position of a media in a printer, the method comprising:
 determining a media advancement prediction based on an angular speed of a roller, wherein the roller is to displace the media onto a platen;
 reading, by a sensor, a media advancement corresponding to the media advancement prediction;
 determining a sensor reading failure based on the media advancement prediction and the read media advancement;
 determining that the media advanced a distance corresponding to the media advancement prediction if the sensor reading failure is detected;
 determining that the media advanced a distance corresponding to the read media advancement if the sensor reading failure is not detected;
 adjusting the position of the media based on the determined media advanced distance.

Feature set 11: A method with feature set 10, further comprising determining the media advance prediction based on the roller speed and at least one of the media type, media thickness, media width, a media input roller radius, a media output roller radius, the voltage of the roller, and a platen vacuum level.

Feature set 12: A method with any of preceding feature set 10 to 11, further comprising determining a sensor reading failure based on a Kalman filter algorithm or a linear quadratic estimation.

Feature set 13: A method with any of preceding feature set 10 to 12, further comprising: comparing the media advancement prediction and the read media advancement with a threshold; and determining a sensor reading failure based on the comparison.

Feature set 14: A non-transitory machine-readable medium storing instructions executable by a processor, the non-transitory machine-readable medium comprising:
 instructions to determine a media advancement prediction based on an angular speed of a roller, wherein the roller is to displace the media onto a platen;
 instructions to read, by a mechanical or optical sensor, a media advancement corresponding to the media advancement prediction;
 instructions to determine a sensor reading failure based on the media advancement prediction and the read media advancement;
 instructions to determine that the media advanced a distance corresponding to the media advancement prediction if the sensor reading failure is detected;
 instructions to determine that the media advanced a distance corresponding to the read media advancement if the sensor reading failure is not detected;
 instructions to adjust the position of the media based on the determined media advanced distance.

Feature set 15: A non-transitory machine-readable medium with feature set 14, further comprising instructions to determine a sensor reading failure based on a Kalman filter algorithm or a linear quadratic estimation.

What it is claimed is:

1. A printing apparatus comprising:
 a platen to hold a media thereon, the media moveable along a media path direction;
 a displacement mechanism to move the media over the platen and along the media path direction;
 a media advancement sensor;
 a controller to:
  determine a media advancement prediction based on an operational parameter of the displacement mechanism;
  determine a read media advancement corresponding to the media advancement prediction;
  determine a sensor reading failure based on the media advancement prediction and the read media advancement;
  determine that the media advanced a distance corresponding to the media advancement prediction if the sensor reading failure is detected;
  determine that the media advanced a distance corresponding to the read media advancement if the sensor reading failure is not detected; and
  adjust the position of the media by controlling the displacement mechanism to move the media based on the determined media advanced distance.

2. The printing apparatus of claim 1, wherein the displacement mechanism is a roller and the operational parameter is an angular speed of the roller.

3. The printing apparatus of claim 1, wherein the controller is to determine the media advance prediction based on the displacement mechanism operational parameter and at least one of the media type, media thickness, the media width, a media input roller radius, a media output roller radius, the voltage of the displacement mechanism, and a platen vacuum level.

4. The printing apparatus of claim 1, wherein the sensor comprises a mechanical or an optical sensor.

5. The printing apparatus of claim 4, wherein the sensor comprises a rotatory encoder or a shaft encoder.

6. The printing apparatus of claim 1, wherein the controller is to control the displacement mechanism to move and adjust a position of the media in an iterative manner, each iteration being completed in less than 10 ms.

7. The printing apparatus of claim 1, wherein the controller is to determine a sensor reading failure based on a Kalman filter algorithm or a linear quadratic estimation.

8. The printing apparatus of claim 1, wherein the controller is to:
 compare the media advancement prediction and the read media advancement with a threshold; and
 determine a sensor reading failure based on the comparison.

9. The printing apparatus of claim 1, wherein the controller is further to adjust a position of the media by controlling a media input roller and/or a media output roller angular speeds based on the determined media advanced distance.

10. A method to adjust a position of a media in a printer, the method comprising:
 determining a media advancement prediction based on an angular speed of a roller, wherein the roller is to displace the media onto a platen;
 reading, by a sensor, a media advancement corresponding to the media advancement prediction;
 determining a sensor reading failure based on the media advancement prediction and the read media advancement;

determining that the media advanced a distance corresponding to the media advancement prediction if the sensor reading failure is detected;
determining that the media advanced a distance corresponding to the read media advancement if the sensor reading failure is not detected; and
adjusting the position of the media based on the determined media advanced distance.

11. The method of claim 10, further comprising determining the media advance prediction based on the roller speed and at least one of the media type, media thickness, media width, a media input roller radius, a media output roller radius, the voltage of the roller, and a platen vacuum level.

12. The method of claim 10, further comprising determining a sensor reading failure based on a Kalman filter algorithm or a linear quadratic estimation.

13. The method of claim 10, further comprising:
comparing the media advancement prediction and the read media advancement with a threshold; and
determining a sensor reading failure based on the comparison.

14. A non-transitory machine-readable medium storing instructions executable by a processor, the non-transitory machine-readable medium comprising:

instructions to determine a media advancement prediction based on an angular speed of a roller, wherein the roller is to displace the media onto a platen;
instructions to read, by a mechanical or optical sensor, a media advancement corresponding to the media advancement prediction;
instructions to determine a sensor reading failure based on the media advancement prediction and the read media advancement;
instructions to determine that the media advanced a distance corresponding to the media advancement prediction if the sensor reading failure is detected;
instructions to determine that the media advanced a distance corresponding to the read media advancement if the sensor reading failure is not detected; and
instructions to adjust the position of the media based on the determined media advanced distance.

15. The non-transitory machine-readable medium of claim 14, further comprising instructions to determine a sensor reading failure based on a Kalman filter algorithm or a linear quadratic estimation.

* * * * *